United States Patent
Koseki et al.

(10) Patent No.: US 11,003,998 B2
(45) Date of Patent: May 11, 2021

(54) RULE CREATION USING MDP AND INVERSE REINFORCEMENT LEARNING

(71) Applicant: INTERNATIONAL BUSINESS MACHINES CORPORATION, Armonk, NY (US)

(72) Inventors: Akira Koseki, Tokyo (JP); Tetsuro Morimura, Tokyo (JP); Toshiro Takase, Tokyo (JP); Hiroki Yanagisawa, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 791 days.

(21) Appl. No.: 15/812,002

(22) Filed: Nov. 14, 2017

(65) Prior Publication Data

US 2018/0293514 A1 Oct. 11, 2018

Related U.S. Application Data

(63) Continuation of application No. 15/484,820, filed on Apr. 11, 2017.

(51) Int. Cl.
*G06N 5/04* (2006.01)
*G06N 7/00* (2006.01)
(Continued)

(52) U.S. Cl.
CPC ............ *G06N 5/025* (2013.01); *B60W 10/18* (2013.01); *B60W 10/20* (2013.01); *B60W 30/18* (2013.01);
(Continued)

(58) Field of Classification Search
None
See application file for complete search history.

(56) References Cited

U.S. PATENT DOCUMENTS

| 9,053,431 | B1 | 6/2015 | Commons | |
| 2011/0288835 | A1* | 11/2011 | Hasuo | G06K 9/6297 |
| | | | | 703/2 |

(Continued)

FOREIGN PATENT DOCUMENTS

| EP | 2998178 A1 | 3/2016 |
| WO | WO 2015181568 | 12/2015 |
| WO | WO 2016021210 | 2/2016 |

OTHER PUBLICATIONS

Ramachandran, Deepak, and Eyal Amir. "Bayesian Inverse Reinforcement Learning." IJCAI. vol. 7. 2007. (Year: 2007).*

(Continued)

*Primary Examiner* — Hal Schnee
(74) *Attorney, Agent, or Firm* — Tutunjian & Bitetto, P.C.; Randall Bluestone

(57) ABSTRACT

A method is provided for rule creation that includes receiving (i) a MDP model with a set of states, a set of actions, and a set of transition probabilities, (ii) a policy that corresponds to rules for a rule engine, and (iii) a set of candidate states that can be added to the set of states. The method includes transforming the MDP model to include a reward function using an inverse reinforcement learning process on the MDP model and on the policy. The method includes finding a state from the candidate states, and generating a refined MDP model with the reward function by updating the transition probabilities related to the state. The method includes obtaining an optimal policy for the refined MDP model with the reward function, based on the reward policy, the state, and the updated probabilities. The method includes updating the rule engine based on the optimal policy.

14 Claims, 12 Drawing Sheets

(51) Int. Cl.
*G06N 5/02* (2006.01)
*B60W 30/18* (2012.01)
*B60W 10/18* (2012.01)
*B60W 10/20* (2006.01)
*G06F 17/16* (2006.01)
*G06N 20/00* (2019.01)
*G05D 1/00* (2006.01)

(52) U.S. Cl.
CPC ............... *G06F 17/16* (2013.01); *G06N 5/04* (2013.01); *G06N 5/043* (2013.01); *G06N 7/005* (2013.01); *G06N 20/00* (2019.01); *B60W 2710/18* (2013.01); *B60W 2710/20* (2013.01); *G05D 1/0088* (2013.01)

(56) References Cited

U.S. PATENT DOCUMENTS

2013/0318023 A1* 11/2013 Morimura .............. G06N 20/00 706/46
2019/0180202 A1* 6/2019 Okimoto .............. G06K 9/6274

OTHER PUBLICATIONS

Brechtel, Sebastian, Tobias Gindele, and Rüdiger Dillmann. "Probabilistic MDP-behavior planning for cars." 2011 14th International IEEE Conference on Intelligent Transportation Systems (ITSC). IEEE, 2011. (Year: 2011).*

Geibel, Peter. "Reinforcement learning for MDPs with constraints." European Conference on Machine Learning. Springer, Berlin, Heidelberg, 2006. (Year: 2006).*
Xu, Xin, et al. "Hierarchical approximate policy iteration with binary-tree state space decomposition." IEEE Transactions on Neural Networks 22.12 (2011): 1863-1877. (Year: 2011).*
Kuter, Ugur, et al. "Task decomposition on abstract states, for planning under nondeterminism." Artificial Intelligence 173.5-6 (2009): 669-695. (Year: 2009).*
Givan, Robert, Thomas Dean, and Matthew Greig. "Equivalence notions and model minimization in Markov decision processes." Artificial Intelligence 147.1-2 (2003): 163-223. (Year: 2003).*
List of IBM Patents or Patent Applications Treated as Related dated Nov. 14, 2017, 2 pages.
Abbeelm et al., "Apprenticeship Learning via Inverse Reinforcement Learning", Appearing in Proceedings of the 21st International Conference on Machine Learning, Jul. 2004, 8 pages.
Klein, et al., "A Cascaded Supervised Learning Approach to Inverse Reinforcement Learning", Research Gate, Sep. 2013, 16 pages.
Knuth, Donald, E., "A Draft of Section 7.1-4: Binary Decision Diagrams", Addison-Wesley, Dec. 2008, 153 Pages.
Levine, et al., "Feature Construction for Inverse Reinforcement Learning", NIPS 2010 Proceedings, Dec. 2010, pp. 1-9.
Wikipedia, "Markov Decision Process", available at: https://en.wikipedia.org/wiki/Markov_decision_process, last downloaded Jan. 11, 2017, pp. 1-10.
Okal et al., "Efficient Inverse Reinforcement Learning using Adaptive State-Graphs", Research Gate, Jul. 2015, 3 pages.
Sarjant, Samuel "Policy Search Based Relational Reinforcement Learning using the Cross-Entropy Method", The University of Waikato, Department of Computer Science, Sep. 2014, 219 pages.

* cited by examiner

RULE CREATION USING MDP AND INVERSE REINFORCEMENT LEARNING

BACKGROUND

Technical Field

The present invention relates generally to information processing and, in particular, to new rule creation using a Markov Decision Process (MDP) and inverse reinforcement learning.

Description of the Related Art

An agent (a robot) driven by a rule engine can be represented by using a MDP (Markov Decision Process) model with unknown reward function and a policy on it. For example, suppose that an agent and a human are talking. Asking a question by the agent corresponds to taking an action specified by a policy on an MDP model, and an answer by the human changes the state of the agent in the MDP model.

To handle all of the possible situations in practice, the ideal rule engine should include a huge number of states (i.e., a huge number of rules). However, it is often impossible (or cumbersome) to write down such an ideal rule engine with a huge number of states.

Therefore, a typical approach is to construct a simpler rule engine that approximates an ideal rule engine by merging some states into a single state. However, even if the simpler rule engine works well for many situations, the simpler rule engine may sometimes fail in practice because of the lack of the number of states. Thus, there is a need for a new rule creation approach.

SUMMARY

According to an aspect of the present invention, a computer-implemented method is provided for rule creation. The method includes receiving (i) a Markov Decision Process (MDP) model with a set of states, a set of actions, and a set of transition probabilities, (ii) a policy that corresponds to rules for a rule engine, and (iii) a set of candidate states that can be added to the set of states. The method further includes transforming the MDP model to include a reward function using an inverse reinforcement learning process on the MDP model and on the policy. The method also includes finding a state from the set of candidate states based on a predetermined criteria. The method additionally includes generating a refined MDP model with the reward function by updating the transition probabilities related to the state. The method further includes obtaining an optimal policy for the refined MDP model with the reward function, based on the reward policy, the state, and the updated transition probabilities related to the state. The method also includes updating the rule engine based on the optimal policy.

According to another aspect of the present invention, a computer program product is provided for rule creation. The computer program product includes a non-transitory computer readable storage medium having program instructions embodied therewith. The program instructions are executable by a computer to cause the computer to perform a method. The method includes receiving (i) a Markov Decision Process (MDP) model with a set of states, a set of actions, and a set of transition probabilities, (ii) a policy that corresponds to rules for a rule engine, and (iii) a set of candidate states that can be added to the set of states. The method further includes transforming the MDP model to include a reward function using an inverse reinforcement learning process on the MDP model and on the policy. The method also includes finding a state from the set of candidate states based on a predetermined criteria. The method additionally includes generating a refined MDP model with the reward function by updating the transition probabilities related to the state. The method further includes obtaining an optimal policy for the refined MDP model with the reward function, based on the reward policy, the state, and the updated transition probabilities related to the state. The method also includes updating the rule engine based on the optimal policy.

According to yet another aspect of the present invention, a computer processing system is provided that is configured to perform rule creation. The computer processing system includes a processor. The processor is configured to receive (i) a Markov Decision Process (MDP) model with a set of states, a set of actions, and a set of transition probabilities, (ii) a policy that corresponds to rules for a rule engine, and (iii) a set of candidate states that can be added to the set of states. The processor is further configured to transform the MDP model to include a reward function using an inverse reinforcement learning process on the MDP model and on the policy. The processor is also configured to find a state from the set of candidate states based on a predetermined criteria. The processor is additionally configured to generate a refined MDP model with the reward function by updating the transition probabilities related to the state. The processor is further configured to obtain an optimal policy for the refined MDP model with the reward function, based on the reward policy, the state, and the updated transition probabilities related to the state. The processor is also configured to update the rule engine based on the optimal policy.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to new rule creation using a Markov Decision Process (MDP) and inverse reinforcement learning.

The present invention provides an increased number of states to improve an MDP model, by automatically extracting a new state from one or more merged states in the MDP model in order to capture reality more precisely, and to update the rules (i.e., update the MDP model and the policy on it) in the rule engine.

In one or more embodiments, it is presumed that the rule engine is written by an expert, and the goal of the update of the rule engine is to imitate the original rule engine written by the expert.

As there are many rule engine-based agents, the present invention makes the update of such rule engines easy to obtain.

Figure 1:
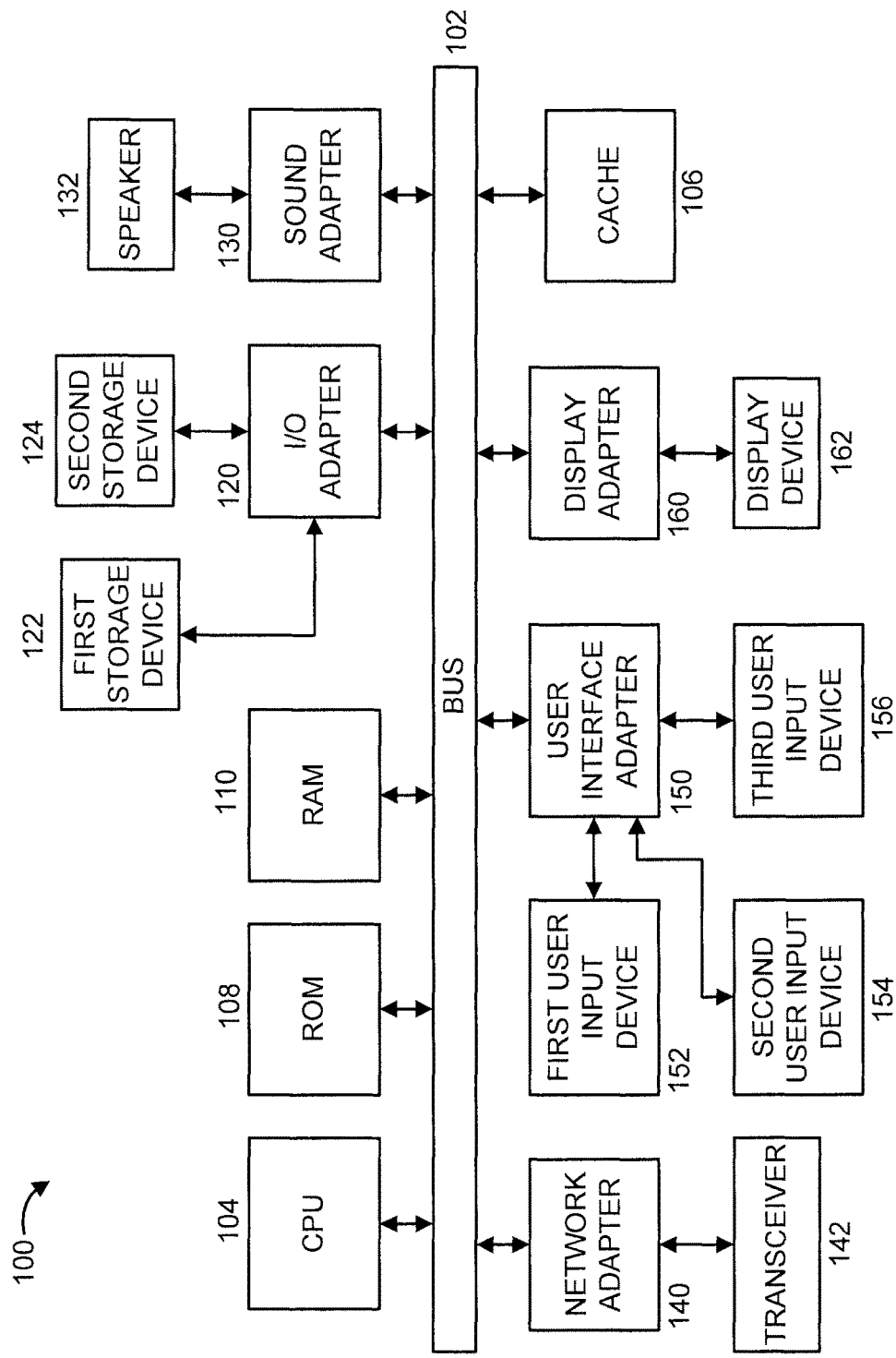
FIG. 1 shows a block diagram of an exemplary processing system to which the invention principles may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
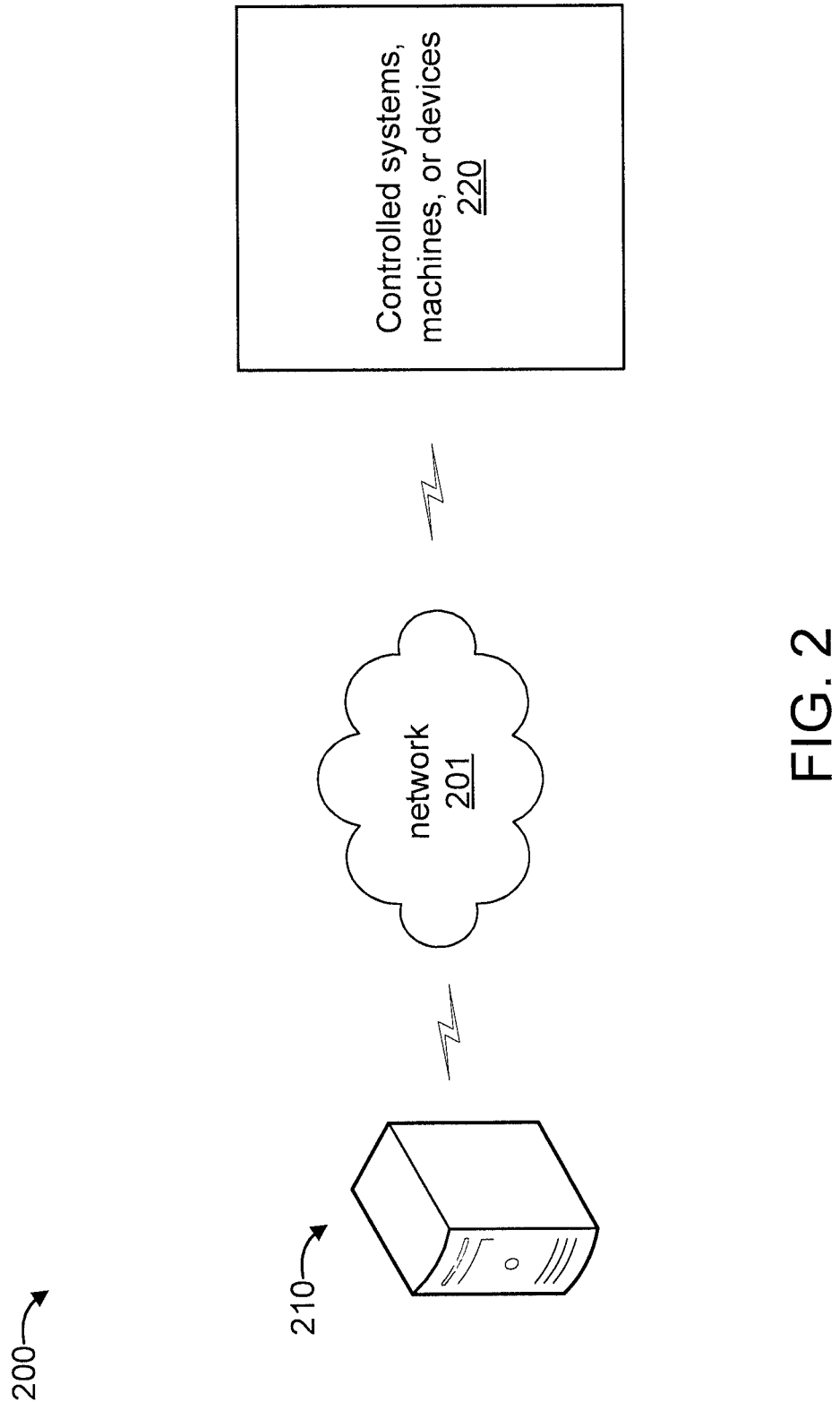
FIG. 2 shows a block diagram of an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 5:
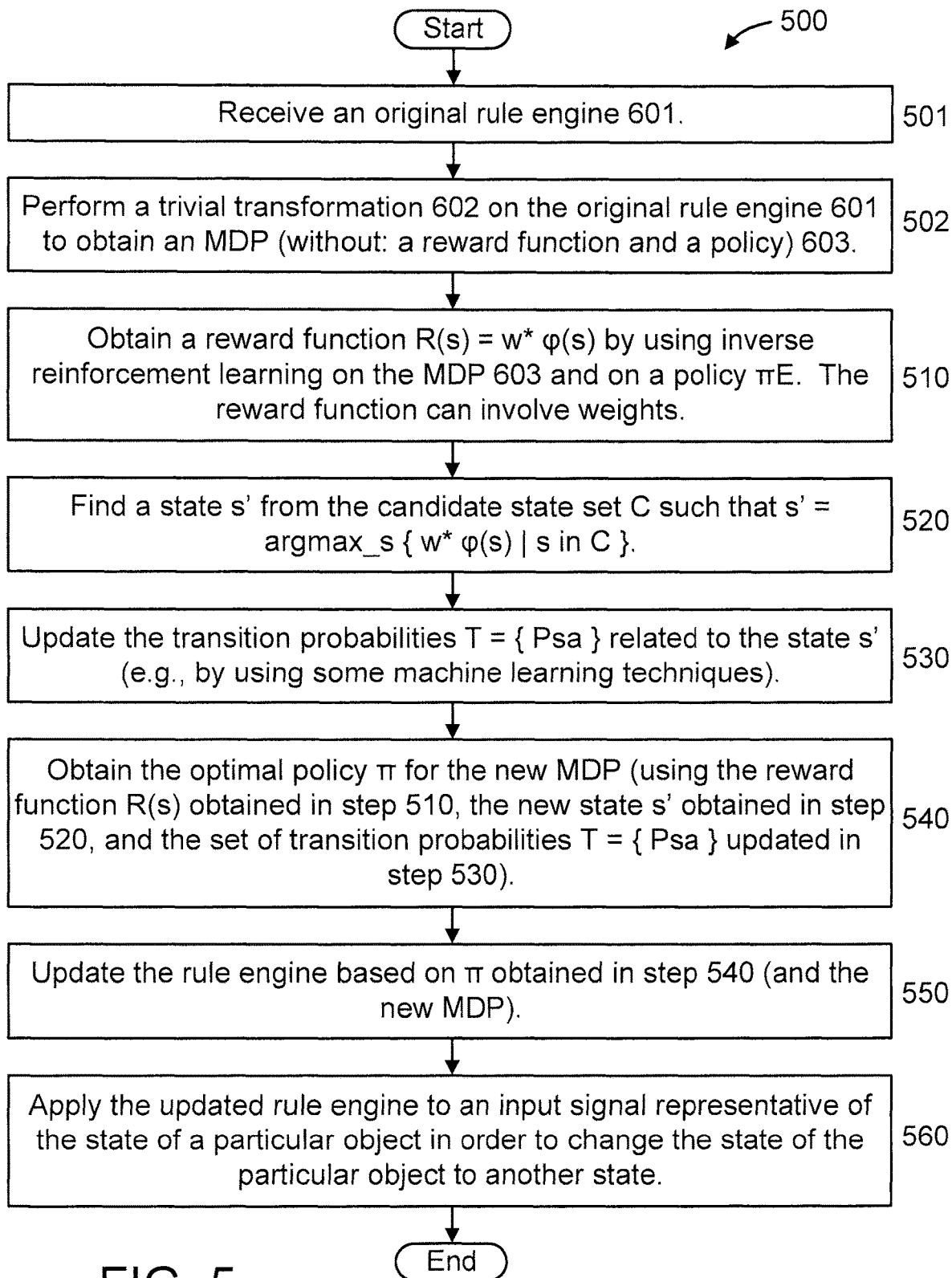
FIG. 5 shows an exemplary method for new rule creation using a Markov Decision Process (MDP) and inverse reinforcement learning, in accordance with an embodiment of the present invention.

Further, it is to be appreciated that processing system 100 may perform at least part of the method described herein including, for example, at least part of method 500 of FIG. 5. Similarly, part or all of environment 200 may be used to perform at least part of method 500 of FIG. 5.

FIG. 2 shows a block diagram of an exemplary environment 200 to which the present invention can be applied, in accordance with an embodiment of the present invention. The environment 200 is representative of a computer network to which the present invention can be applied. The elements shown relative to FIG. 2 are set forth for the sake of illustration. However, it is to be appreciated that the present invention can be applied to other network configurations and other operational environments/applications as readily contemplated by one of ordinary skill in the art given the teachings of the present invention provided herein, while maintaining the spirit of the present invention. The other operational environments/applications include, but are not limited to, workplace safety (e.g., involving controlling one or more machines), automated driving (e.g., involving controlling an automobile), and so forth.

The environment 200 at least one computer processing system 210 and at least one controlled system(s), machine(s), and/or device(s) (individually and collectively denoted by the reference numeral 220 and hereinafter referred to as "controlled system, machine, and/or device"). For the sake of simplicity and illustration, the preceding elements are shown in singular form, but can be readily extended to more than one of any of the preceding elements as readily appreciated by one of ordinary skill in the art given the teachings of the present invention provided herein, while maintaining the spirit of the present invention. The computer processing system 210 can be any type of computer processing system including, but not limited to, a server, a desktop computer, a laptop computer, a tablet, a smart phone, a media playback device, and so forth, depending upon the particular implementation. For the sake of illustration, the computer processing system 210 is a server.

The computer processing system 210 is configured to perform new rule creation using MDP and inverse reinforcement learning. Moreover, the computer processing system 210 is configured to perform an action (e.g., a control action) on the controlled system, machine, and/or device 220 responsive to an application of a set of rules to an input (e.g., an input signal representative of a current state of the controlled system, machine, and/or device 220. Such action can include, but is not limited to, one or more of: powering down the controlled system, machine, and/or device 220 or a portion thereof; powering down, e.g., a system, machine, and/or a device that is affected by a state (e.g., an anomaly in) of another device, opening a valve to relieve excessive pressure (depending upon the anomaly), controlling vehicle functions (e.g., acceleration, braking, steering, etc.) and so forth. As is evident to one of ordinary skill in the art, the action taken is dependent upon the type of anomaly and the controlled system, machine, and/or device 220 to which the action is applied.

The controlled system, machine, and/or device 220 can be a computer, an assembly line, a hardware-based machine, a vehicle (or a portion or system thereof including, but noted limited to, power, braking, steering, etc.), and so forth. As is readily appreciated by one of ordinary skill in the art, the particular controlled system, machine, and/or device 220 used depends upon the particular implementation to which the present invention is applied.

In the embodiment shown in FIG. 2, the elements thereof are interconnected by a network(s) 201. However, in other embodiments, other types of connections (e.g., wired, etc.) can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of environment 200 are readily determined by one of ordinary skill in the art, given the teachings of the present invention provided herein, while maintaining the spirit of the present invention.

In one or more embodiments, the following notation can be used. Specifically, an MDP is represented by a tuple (S, A, T, γ, D, R), where S is a set of states, A is a set of actions, T={Psa} is a set of transition probabilities (where Psa is the state transition distribution upon taking action a in state s), γ is a discount factor (a constant between 0 and 1), D is an initial-state distribution, and R is a reward function. A policy πE corresponds to rules for the rule engine. In an embodiment, the rules are written by an expert. Each state s in S is associated with some feature vector φ(s), where φ(s) is a K-dimensional bit vector.

In one or more embodiments, the following presumption can be used. Specifically, the policy πE can be emulated by using a reward function of the form R(s)=w*φ(s), where w* is a K-dimensional real-valued vector.

In one or more embodiments, the following inputs can be used: (i) MDP model (S, A, T, γ, D, R) with unknown reward function R; (ii) policy πE; and (iii) a set of candidate states C (that can be added to set S).

Figure 3:
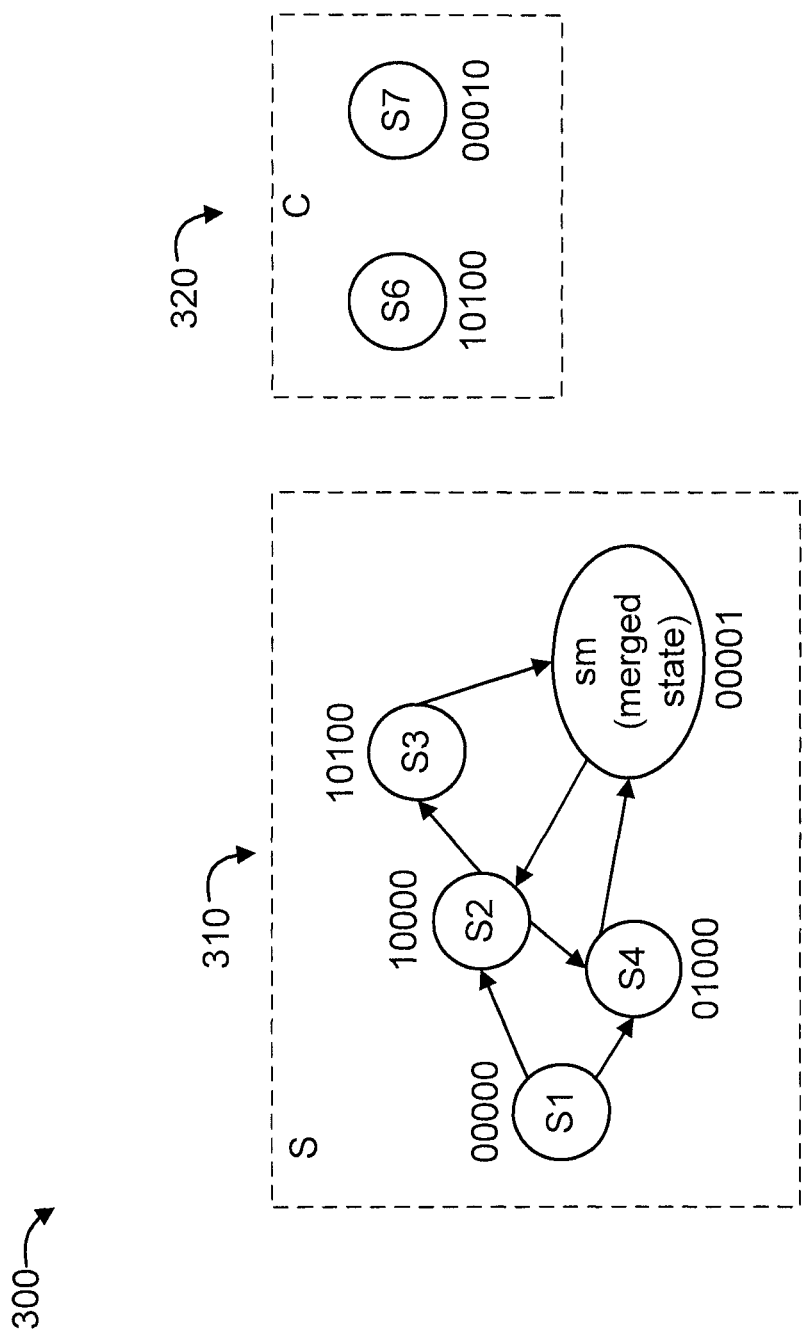
FIG. 3 shows a portion of an exemplary input to which the present invention can be applied, in accordance with an embodiment of the present invention.

FIG. 3 shows a portion (hereinafter "input portion") 300 of an exemplary input to which the present invention can be applied, in accordance with an embodiment of the present invention.

The input portion 300 includes a set of states S 310 in a MDP model. The set of states S 310 includes state S1, state S2, state S3, state S4, and merged state sm.

The input portion 300 further includes a set of candidate states C 320 (which corresponds to the states that can be added to the set of states S 310).

Figure 4:
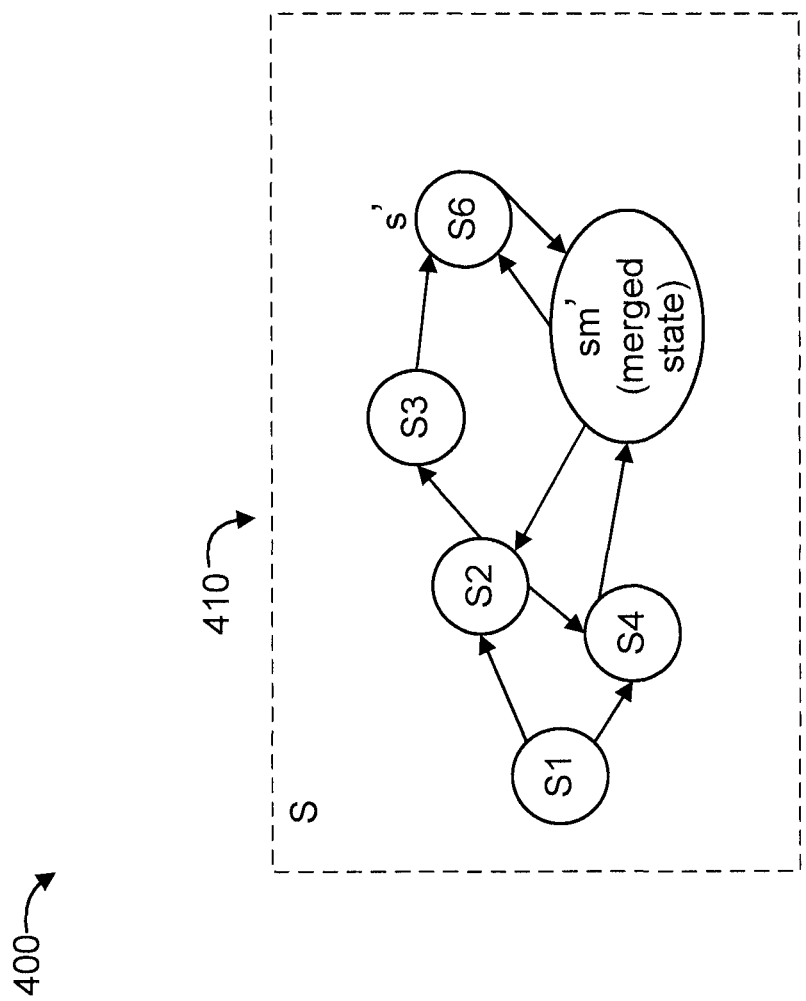
FIG. 4 shows an exemplary output from the present invention, in accordance with an embodiment of the present invention.

FIG. 4 shows an exemplary output 400 from the present invention, in accordance with an embodiment of the present invention. The output 400 is based on the input 300 shown in FIG. 3.

The output 400 includes a set of states 410 in an MDP model. The set of states 410 includes state S1, state S2, state S3, state S4, merged state sm', and state S6 (also denoted as "state s'"). It is to be appreciated that state S6 is extracted as a new state from merged state sm. In this way, possible scenarios that will be encountered and processed in accordance with the present invention will be more precisely modeled by the MDP model.

Figure 6:
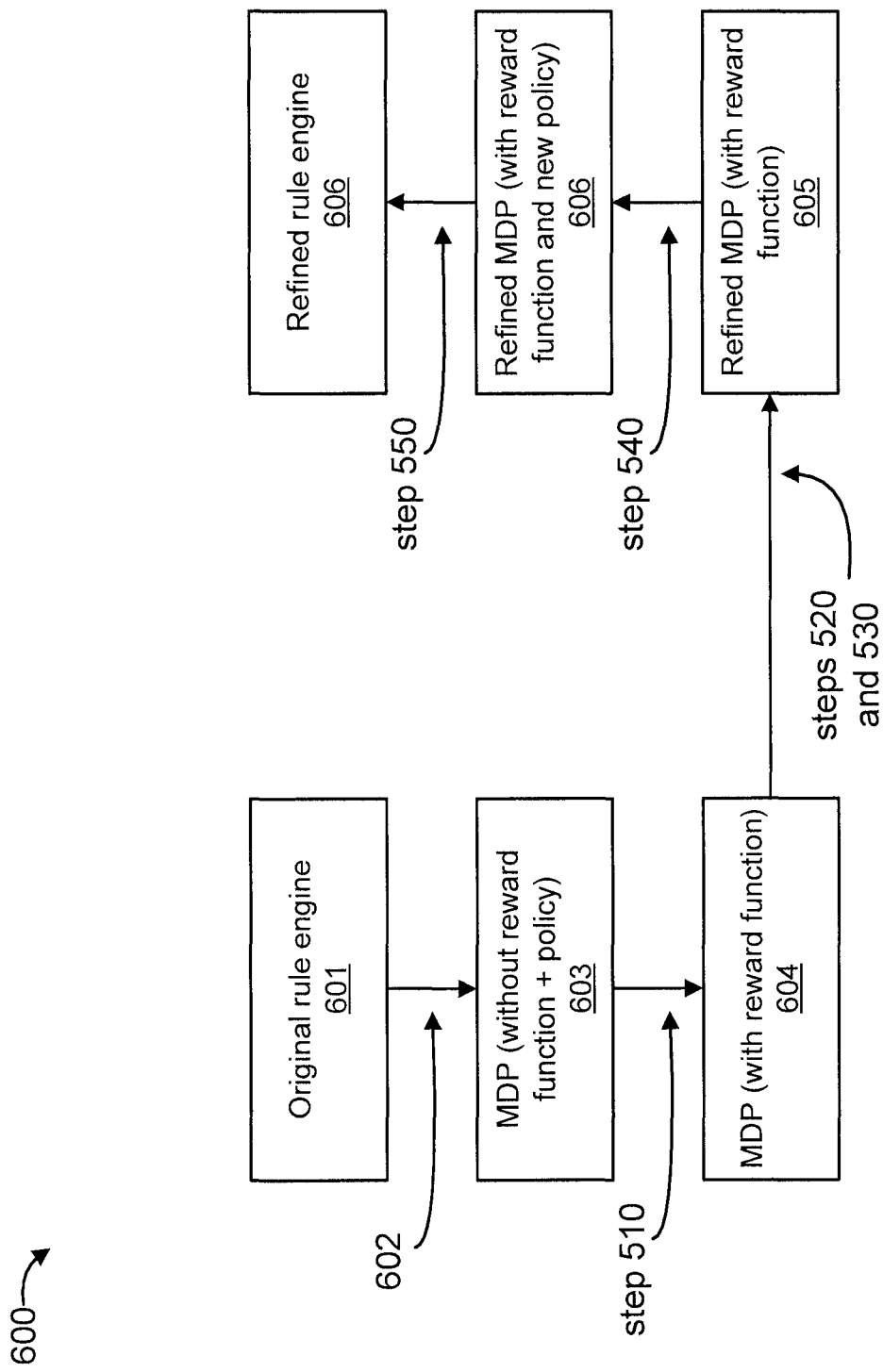
FIG. 6 shows the inputs and outputs corresponding to the method of FIG. 5, in accordance with an embodiment of the present invention.

FIG. 5 shows an exemplary method 500 for new rule creation using a Markov Decision Process (MDP) and inverse reinforcement learning, in accordance with an embodiment of the present invention. FIG. 6 shows the inputs and outputs corresponding to the method 500 of FIG. 5, in accordance with an embodiment of the present invention.

At step 501, receive an original rule engine 601.

At step 502, perform a trivial transformation 602 on the original rule engine 601 to obtain an MDP (without a reward function and without a policy) 603. The term "without a reward function" can encompass no reward function or an unknown reward function.

At step 510, obtain a reward function R(s)=w*φ(s) by using inverse reinforcement learning on the MDP 603 and on a policy πE. Hence, from step 510, an MDP (with reward function) 604 is obtained. The reward function can involve weights. For example, particular bits can be weighted depending on their position and/or meaning and/or so forth.

In an embodiment, step 510 can involve inverse reinforcement learning. Of course, other techniques can also be used, as readily appreciated by one of ordinary skill in the art given the teachings of the present invention provided herein, while maintaining the spirit of the present invention.

At step 520, find a state s' from the candidate state set C such that s'=argmax_s {w*φ(s)|s in C}.

At step 530, update the transition probabilities T={Psa} related to the state s' (e.g., by using some machine learning techniques). Hence, from steps 520 and 530, a refined MDP (with reward function) 605 is obtained.

At step 540, obtain the optimal policy π for the new MDP (using the reward function R(s) obtained in step 510, the new state s' obtained in step 520, and the set of transition probabilities T={Psa} updated in step 530). Hence, from step 540, a refined MDP (with reward function and with a new policy) 606 is obtained. The optimal policy π for the new MDP can be obtained via a standard algorithm for MDP such as, but not limited to, value iteration and policy iteration. Of course, other techniques can also be used, as readily appreciated by one of ordinary skill in the art given the teachings of the present invention provided herein, while maintaining the spirit of the present invention. As used herein, the term "optimal policy" can refer to a policy that better coincides with (better represents) an item being modeled (e.g., user preferences) than simply a "policy" (that is not "optimal").

At step 550, update the rule engine based on π obtained in step 540 (and the new MDP). Hence, from step 550, a refined rule engine 607 is obtained.

At step 560, apply the updated rule engine to an input signal representative of the state of a particular object in order to change the state of the particular object to another state. For example, in the case of automatic driving, the updated rule engine may detect an object in the path of a subject vehicle and automatically (and safely) turn the wheel in order to avoid the object. The implicated rules can involve whether there is another lane to turn in, whether there is a car in the way in the other lane, and so forth.

Step 520 of FIG. 5 will now be further described in accordance with an embodiment of the present invention.

If |C| is small, we can use a naïve algorithm to compute argmax_s {w*φ(s)|s in C}. Furthermore, we may use other criteria to select a state s. For example, we can select state s such that the optimum policy with incorporating state s is most different from the policy πE.

If |C| is huge, we cannot use a naïve algorithm to compute argmax_s {w*φ(s)|s in C}. In such a case, we can use the Binary Decision Diagram (BDD) to reduce the computation time.

Independent to the size of |C|, we can select multiple states in step 520. Or, we can divide a merged state into two sets of merged states by using the bit-vector (see FIG. 6).

Step 530 of FIG. 5 will now be further described in accordance with an embodiment of the present invention.

Figure 7:
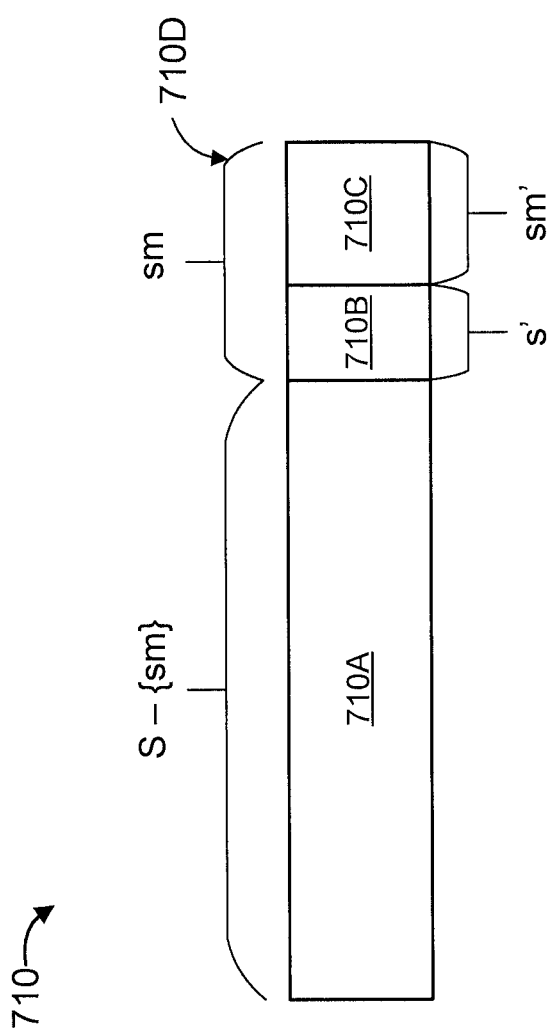
FIG. 7 graphically shows a step of the method of FIG. 5, in accordance with an embodiment of the present invention.

FIG. 7 graphically shows step 530 of the method 500 of FIG. 5, in accordance with an embodiment of the present invention.

The transition probabilities Psa 710 that are updated by step 530 include a portion 710A for S-{sm}, a portion 710B for s', and a portion 710C for sm'. The portion 710B for s' and the portion 710C for sm' equate to a portion 710D for sm.

Also, Ps'a represents the probability to take an action a on state s', and Psm'a represents the probability to take an action a on state sm'.

Figure 8:
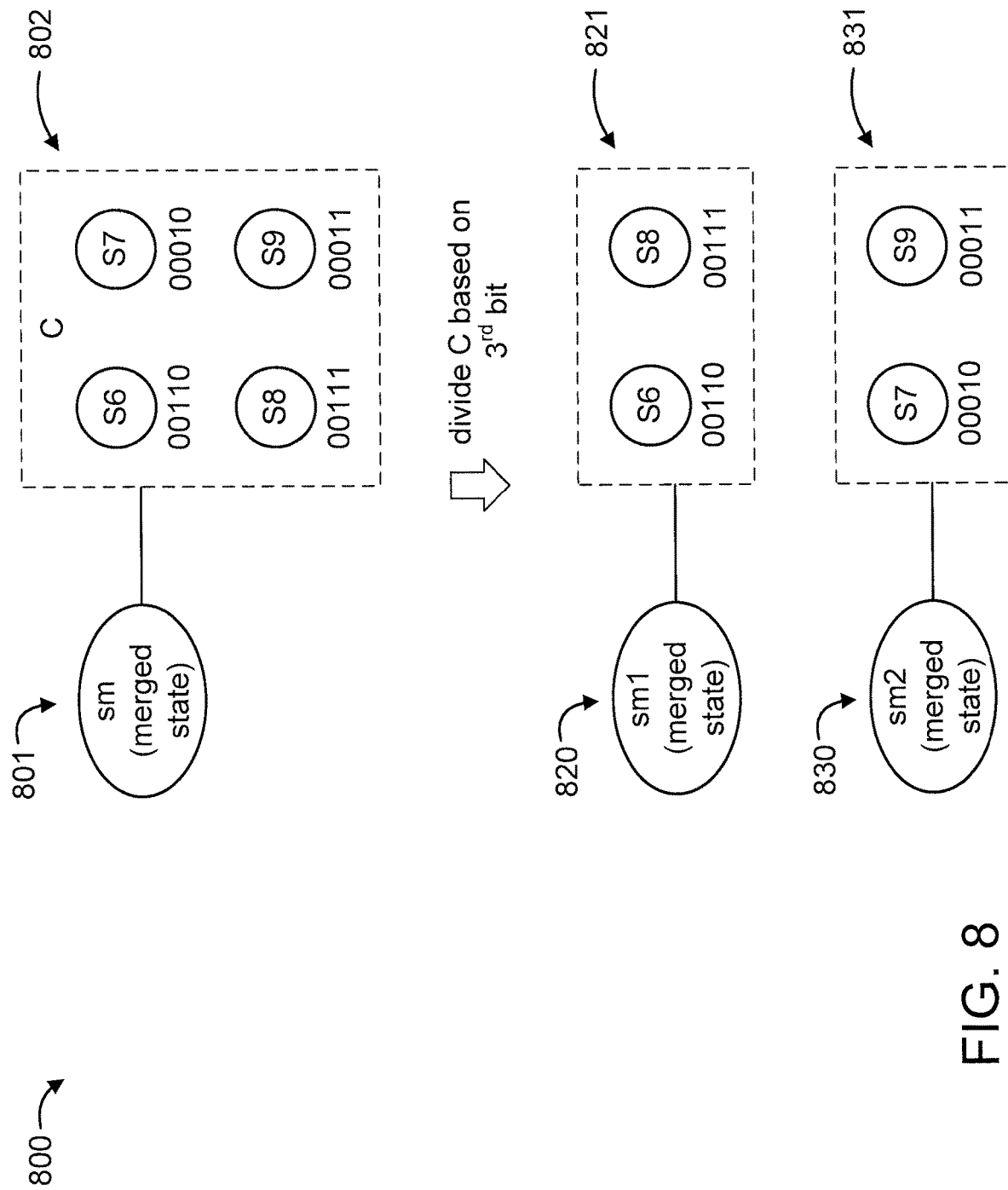
FIG. 8 shows an exemplary division operation on a merged state, in accordance with an embodiment of the present invention.

FIG. 8 shows an exemplary division operation 800 on a merged state, in accordance with an embodiment of the present invention.

The division operation 800 involves a merged state sm 801 and a set of candidate states C 802. The set of candidate states C 802 include state S6, state S7, state S8, and state S9. State S6 has a value of 00110, State S7 has a value of 00010, State S8 has a value of 00111, and State S9 has a value of 00011.

The set of candidate states C 802 is divided based on the third bit to obtain the following two sets of merged states: sm1 820 and sm2 830 (and corresponding candidate sets c1 821 and c2 831, respectively). That is, candidate set c1 821 corresponds to merged state sm1 820, and candidate set c2 831 corresponds to merged state sm2 830.

Step 530 of FIG. 5 will now be further described in accordance with an embodiment of the present invention.

In an embodiment, the transition probabilities T={Psa} are updated by some machine learning technique. Moreover, in an embodiment, the transition probabilities can be later refined by using experiments.

Regarding the termination condition for method 500, we can repeat the proposed algorithm several times to further refine the rule engine.

In an embodiment, the number of loops can be specified by a parameter. In an embodiment, the refinement of the rule engine can be repeated until the improvement of the expected future reward becomes very small (e.g., below a threshold amount).

A description will now be given regarding an implementation of the present invention regarding automatic driving.

In a simple example, a car location can be represented by using 3 bits for a three-lane road, with each bit location from among the 3 bit locations indicating whether the car is present in a lane corresponding to that bit location. Thus, when the subject car is in the first lane, the first bit location will be equal to one; when the subject car is in the second lane, the second bit location will be equal to one; when the subject car is in the third lane, the third bit location will be equal to one. Hence, there are 3 legal bit patterns for the first three bits (only the bit patterns 001*, 010*, and 100* are allowed). Each bit pattern corresponds to a car occupying a particular one of the three lanes.

Figure 9:
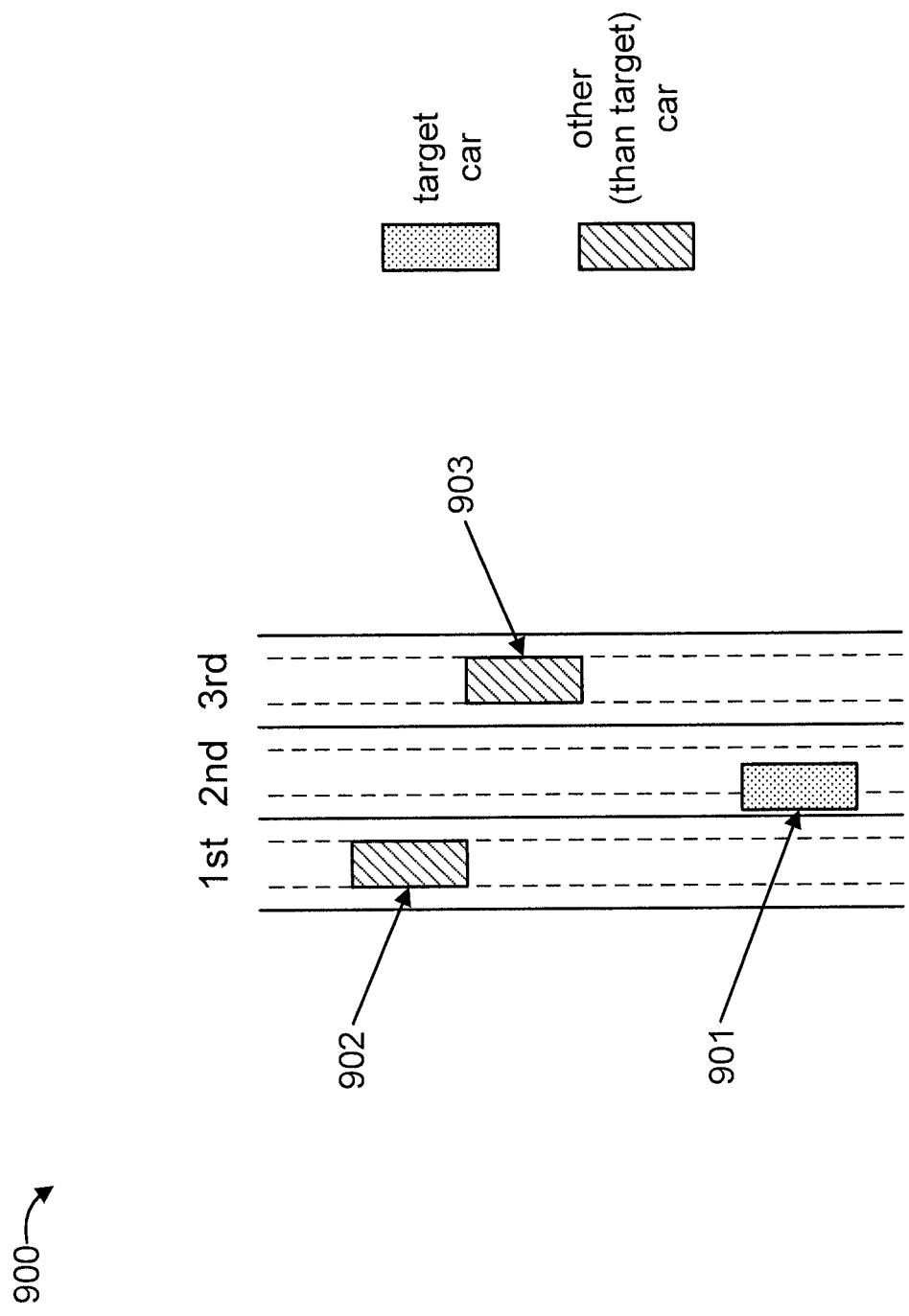
FIG. 9 shows an exemplary model representation relating to a three-lane road, in accordance with an embodiment of the present invention.

FIG. 9 shows an exemplary model representation 900 relating to a three-lane road, in accordance with an embodiment of the present invention.

The three-lane road includes a first (1st) lane, a second (2nd) lane, and a third (3rd) lane. The model representation 900 includes a target car 901 and other cars 902 and 903.

In the model representation 900 relative to the preceding simply example, four bits have been added to represent the detailed location of a target car only when the target car is in the second lane. There are five legal bit patterns for the first seven bits (1001000*, 0100100*, 0100010*, 0100001*, and 0011000*). Note here that bit pattern 1001000* represents that the target car is in the first lane (and unknown position in the lane), bit pattern 0011000* represents that the target car is in the third lane (and unknown position in the lane), and other three patterns represent that the target car is in the second lane.

Hence, TABLE 1 can represent possible conditions represented by the 7 bits.

TABLE 1

| Bit | Description |
| --- | --- |
| 0 | In first lane |
| 1 | In second lane |
| 0 | In third lane |
| 0 | Unknown position in a lane |
| 1 | Left-positioned in a lane |
| 0 | Centered in a lane |
| 0 | Right-positioned in a lane |
| . . . | More bits to represent other cars |

Figure 10:
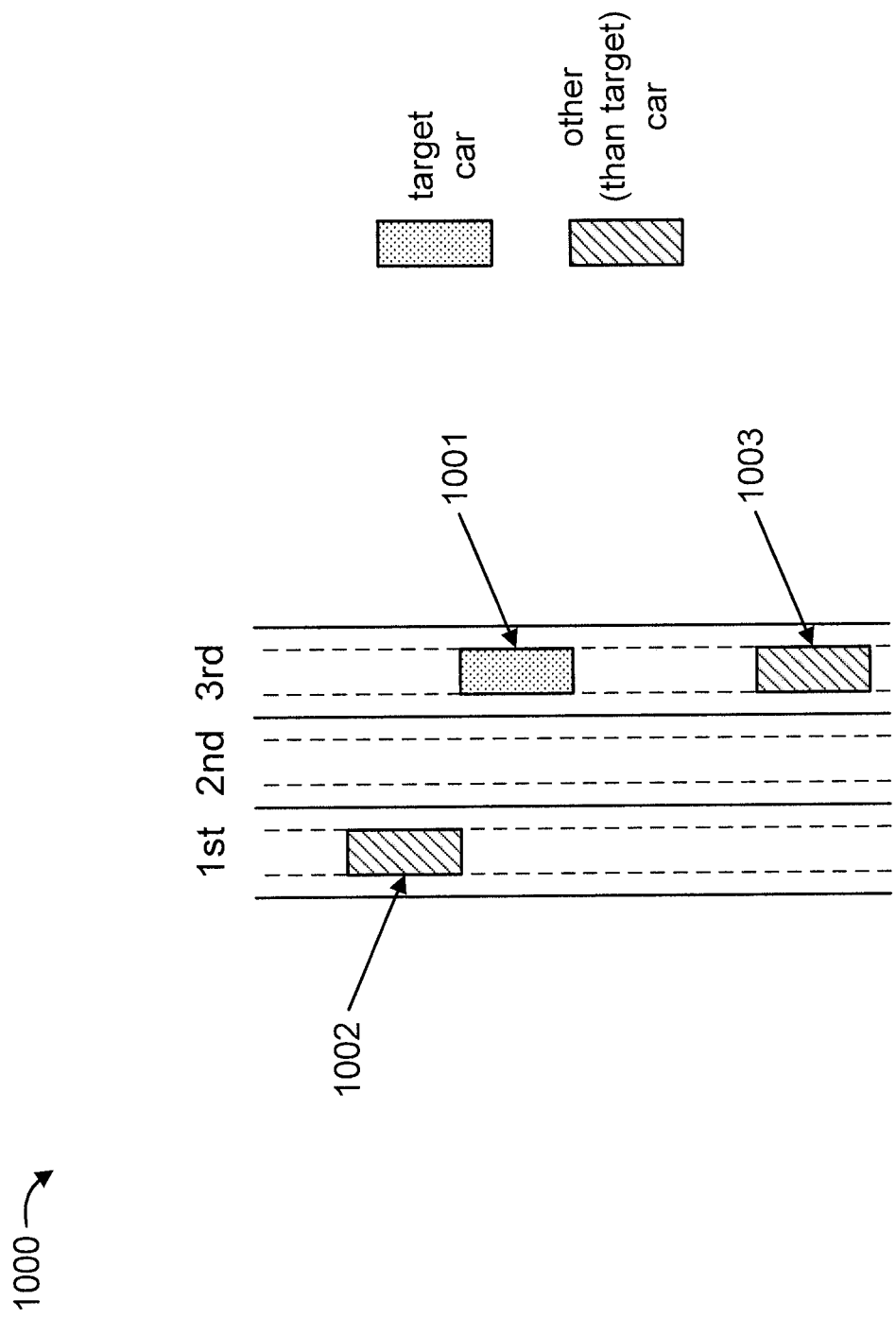
FIG. 10 shows a further detailed exemplary model representation relating to a three-lane road, in accordance with an embodiment of the present invention.

FIG. 10 shows a further detailed exemplary model representation 1000 relating to a three-lane road, in accordance with an embodiment of the present invention.

The three-lane road includes a first (1st) lane, a second (2nd) lane, and a third (3rd) lane. The model representation 1000 includes a target car 1001 and other cars 1002 and 1003.

In the model representation 1000, we use the three bits from the 5$^{th}$ to 7$^{th}$ positions to represent the detailed location inside a lane if the target car is in the second or third lane (whereas we use these bits only when the target car is in the second lane in the representation 900 in FIG. 9), and hence the number of legal bit patterns for the first seven bits becomes seven to represent the detailed location of a target car when the target is in the third lane.

Hence, TABLE 2 can represent possible conditions represented by the 7 bits.

TABLE 2

| Bit | Description |
| --- | --- |
| 0 | In first lane |
| 0 | In second lane |
| 1 | In third lane |
| 0 | Unknown position in a lane |
| 0 | Left-positioned in a lane |
| 1 | Centered in a lane |
| 0 | Right-positioned in a lane |
| . . . | More bits to represent other cars |

In the model representation 1000, the merged state with a bit pattern sm=0011000* in the detailed model will be divided into three new states with the bit patterns C={0010100*, 0010010*, 0010001*}.

Figure 11:
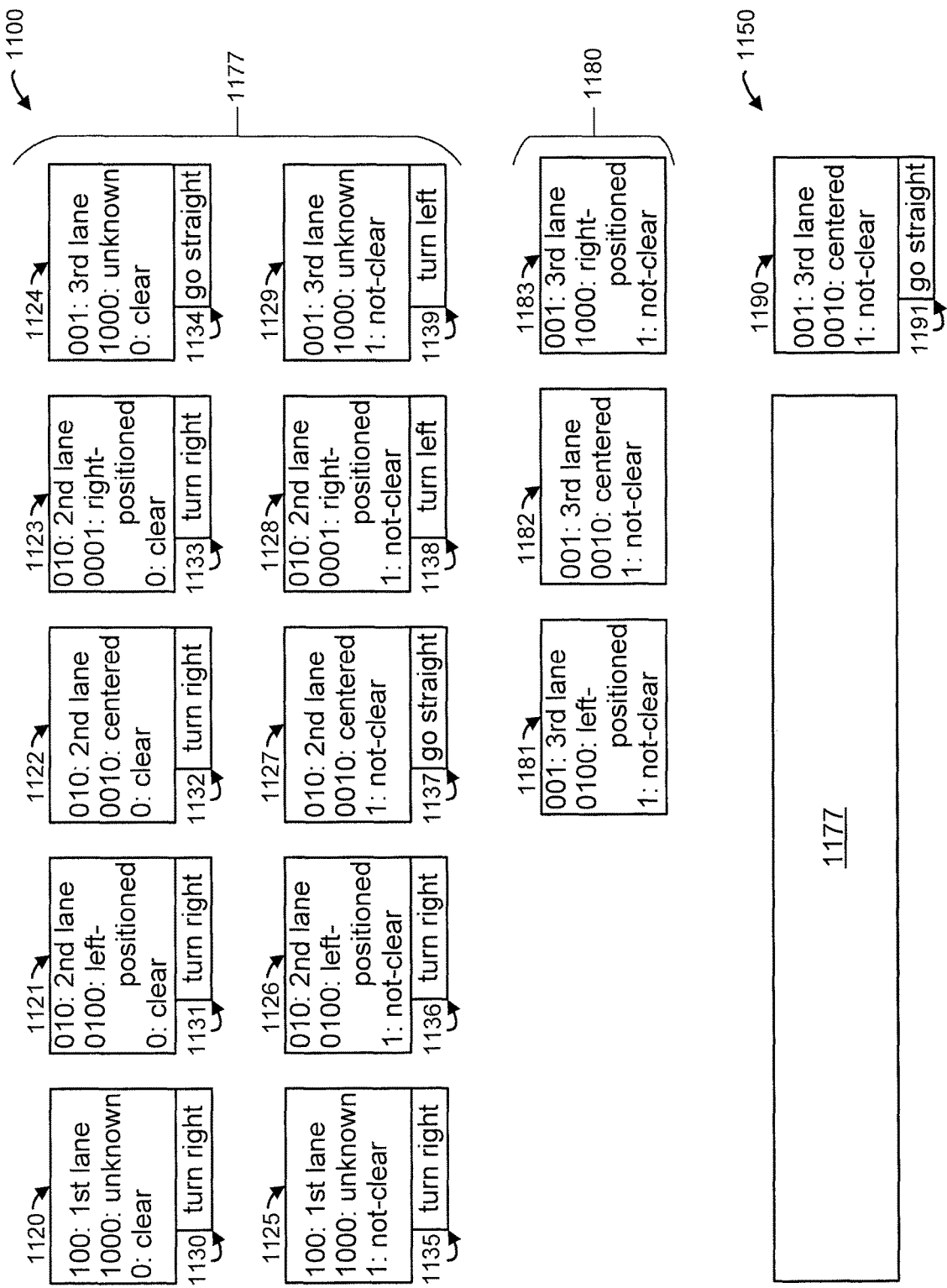
FIG. 11 shows an exemplary rule engine and an exemplary refined rule engine, corresponding to the model representations of FIGS. 9 and 10, respectively.

FIG. 11 shows an exemplary rule engine 1100 and an exemplary refined rule engine 1150, corresponding to the model representations 900 and 1000 of FIGS. 9 and 10, respectively.

Only 1 bit is used to represent the state of the other cars around the target car, as follows:
0=clear, there is no other car around my car
1=not-clear, there is at least one other car around my car FIG. 12 graphically shows the preceding states 1200 of clear and not-clear, in accordance with an embodiment of the present invention. The example of FIG. 12 involves a three-lane road having a first (1st) lane, a second (2nd) lane, and a third (3rd) lane. Moreover, the example of FIG. 12 involves a target car 1201 and another car 1202.

Figure 12:
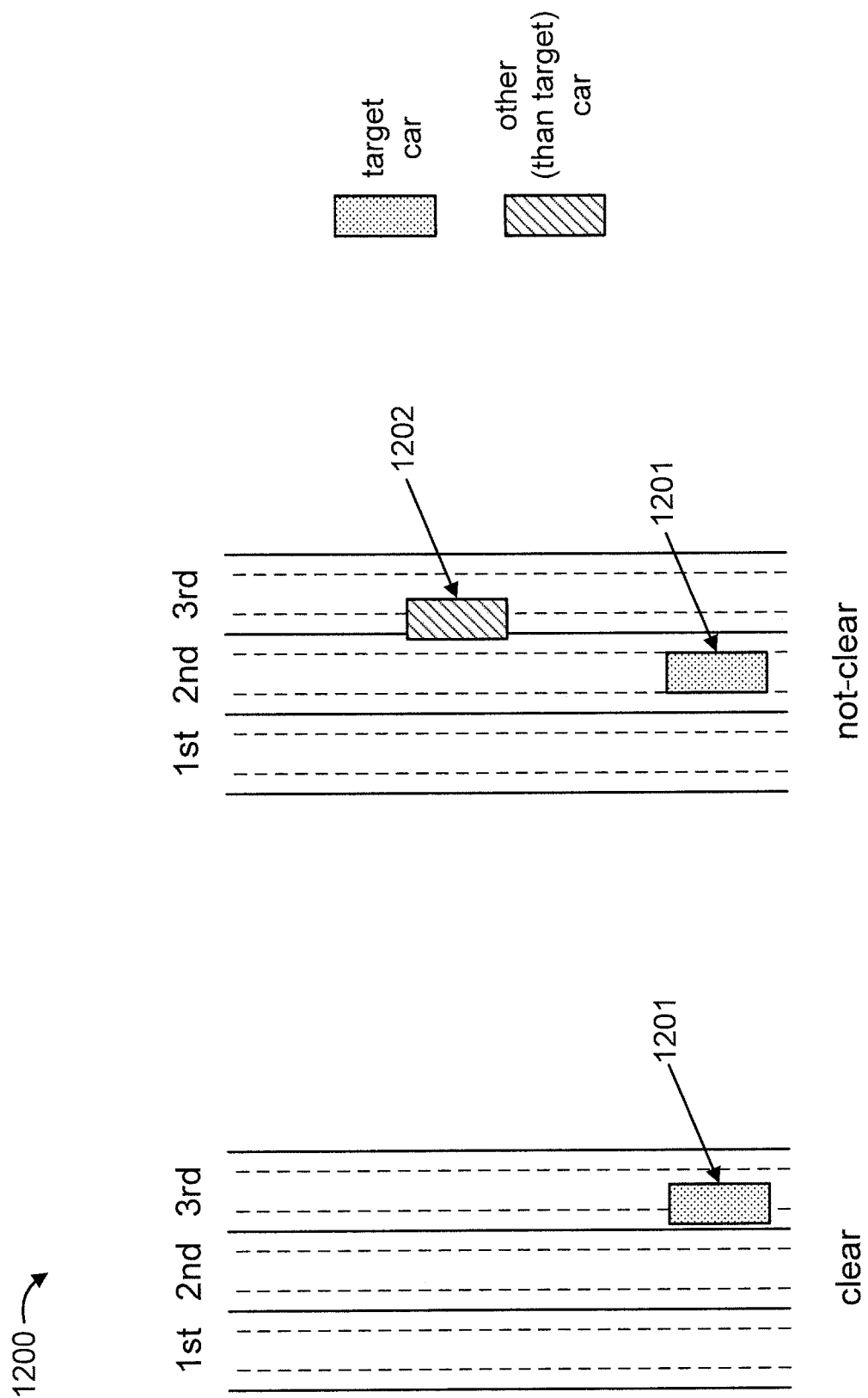
FIG. 12 graphically shows states of clear and not-clear, in accordance with an embodiment of the present invention.

Regarding the rule engine 1100, (i) when clear, the driver of the target car prefers the third lane (as shown on the left side in FIG. 12 corresponding to the "clear" state), and (ii) when not-clear, the driver of the target car prefers the center of the second lane (as shown on the left side in FIG. 12 corresponding to the "not-clear" state).

In FIG. 11, a set rectangles of a first size are shown, as well as a set of rectangles of a second (smaller) size. The (larger) rectangles correspond to states, and the (smaller) rectangles correspond to an action selected by a policy.

In particular, FIG. 11 shows states 1120-1129 and actions 1130-1139 corresponding to rule engine 1100 and model representation 900. The states 1120-1129 and actions 1130-1139 corresponding to the rule engine 1100 and model representation 900 are collectively denoted by the reference numeral 1177.

Relating to step 510 of method 500 of FIG. 5, a reward function is obtained that has large weights for the second (2nd), third (3rd), and sixth (6th) bits. That is, the driver of the target car 1201 prefers the 2nd lane, the 3rd lane, and the center position inside a lane.

Relating to step 520 of method 500 of FIG. 5, from the states 1120-1129, a candidate set C 1180 is created from a merged state. The candidate set C 1180 includes a state 1181 (corresponding to a "left-positioned" state of the target car 1201 in the third lane), a state 1182 (corresponding to a "centered" positioned state of the target car 1201 in the third lane), and a state 1183 (corresponding to a "right-positioned" state of the target car 1201 in the third lane).

The states and actions corresponding to rule engine 1150 and model representation 1000 includes the states and actions 1177 (i.e., states 1120-1129 and actions 1130-1139) as well as a new state 1190 (and new corresponding action 1191). That is, relating to step 520 of method 500 of FIG. 5, new state 1190 is added to the rule engine 1100 to form the refined rule engine 1150. The new state 1190 that is added to the rule engine 1100 to form the rule engine 1150 corresponds to the "centered" position in the 3rd lane.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer program product for rule creation, the computer program product comprising a non-transitory computer readable storage medium having program instructions embodied therewith, the program instructions executable by a computer to cause the computer to perform a method comprising:
    receiving (i) a Markov Decision Process (MDP) model with a set of states, a set of actions, and a set of transition probabilities, (ii) a policy that corresponds to rules for a rule engine, and (iii) a set of candidate states that can be added to the set of states, wherein the candidate states in the set of candidate states are determined from a merged state formed by merging two or more different states in the set of states, and wherein the set of transition probabilities relate to the set of states and the set of candidate states;
    transforming the MDP model to include a reward function using an inverse reinforcement learning process on the MDP model and on the policy;
    finding a new state for the set of states from the set of candidate states based on predetermined criteria;
    generating a refined MDP model with the reward function by updating any of the transition probabilities related to the new state;
    obtaining an optimal policy for the refined MDP model with the reward function, based on a reward policy, the state, and the updated transition probabilities related to the new state; and
    updating the rule engine based on the optimal policy.

2. The computer program product of claim 1, wherein said receiving step receives the MDP model further with a discount factor and an initial-state distribution.

3. The computer program product of claim 2, wherein the discount factor comprises a constant having a value between zero and one.

4. The computer program product of claim 1, wherein the reward function comprises one or more weights corresponding to respective bits in the reward function.

5. The computer program product of claim 4, wherein the new state from the set of candidate states is found based on the one or more weights.

6. The computer program product of claim 1, wherein each of the states in the set of states is associated with a K-dimensional bit feature vector.

7. The computer program product of claim 1, wherein the predetermined criteria comprises the new state having a value equal to argmax_s {w*φ(s)|s in the candidate state set}, wherein s is the state, w* is a K-dimensional real-valued vector, and φ(s) is a K-dimensional bit feature vector.

8. The computer program product of claim 1, wherein the predetermined criteria comprises finding the new state from the set of candidate states such that the optimal policy most differs from the policy of said receiving step.

9. The computer program product of claim 1, wherein the policy is emulated by the reward function, and wherein the reward function is equal to w*φ(s), where w* is a K-dimensional real-valued vector, and where φ(s) is a K-dimensional bit feature vector.

10. The computer program product of claim 1, wherein the optimal policy is obtained by applying a value iteration and policy iteration process to the reward policy, the state, and the updated transition probabilities related to the new state.

11. The computer program product of claim 1, wherein the method further comprises applying the updated rule engine to an input signal representative of a current state of a particular object in order to change the current state of the particular object to another state.

12. The computer program product of claim 11, wherein said applying step comprises controlling a function affecting a motion of a vehicle.

13. The computer program product of claim 1, wherein the method further comprises adding the new state from the set of candidate states to the refined MDP model.

14. A computer processing system configured to perform rule creation, comprising:

a processor configured to:

receive (i) a Markov Decision Process (MDP) model with a set of states, a set of actions, and a set of transition probabilities, (ii) a policy that corresponds to rules for a rule engine, and (iii) a set of candidate states that can be added to the set of states, wherein the candidate states in the set of candidate states are determined from a merged state formed by merging two or more different states in the set of states, and wherein the set of transition probabilities relate to the set of states and the set of candidate states;

transform the MDP model to include a reward function using an inverse reinforcement learning process on the MDP model and on the policy;

find a new state for the set of states from the set of candidate states based on predetermined criteria;

generate a refined MDP model with the reward function by updating any of the transition probabilities related to the new state;

obtain an optimal policy for the refined MDP model with the reward function, based on reward policy, the state, and the updated transition probabilities related to the new state; and update the rule engine based on the optimal policy.

* * * * *